E. C. HODGES.
FOUR WHEEL DRIVE.
APPLICATION FILED JULY 31, 1913.
1,137,140.
Patented Apr. 27, 1915.
2 SHEETS—SHEET 1.
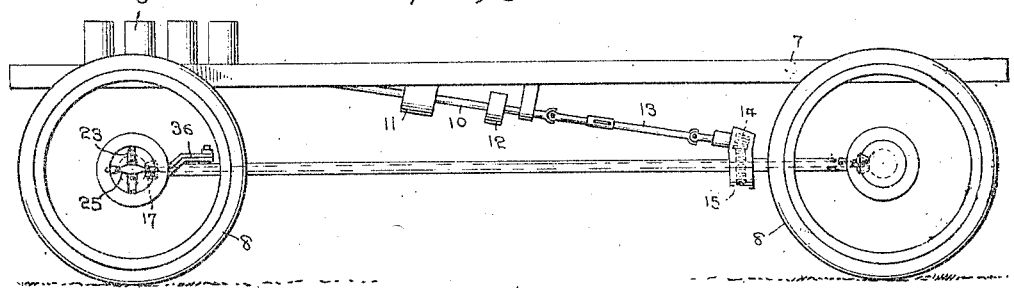
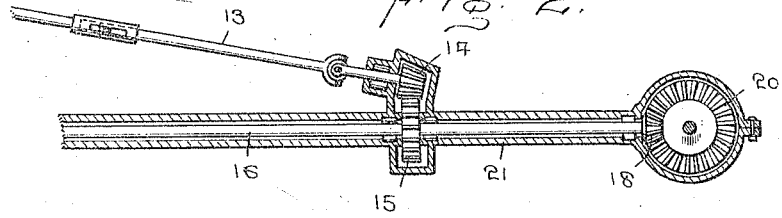
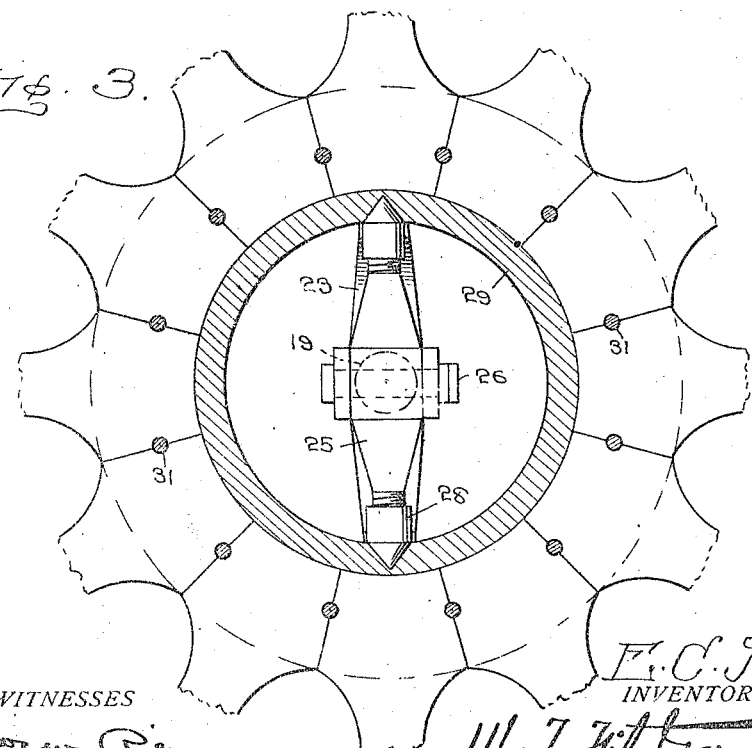
WITNESSES
E. C. Hodges
INVENTOR
W. J. Fitzgerald & Co.
Attorneys

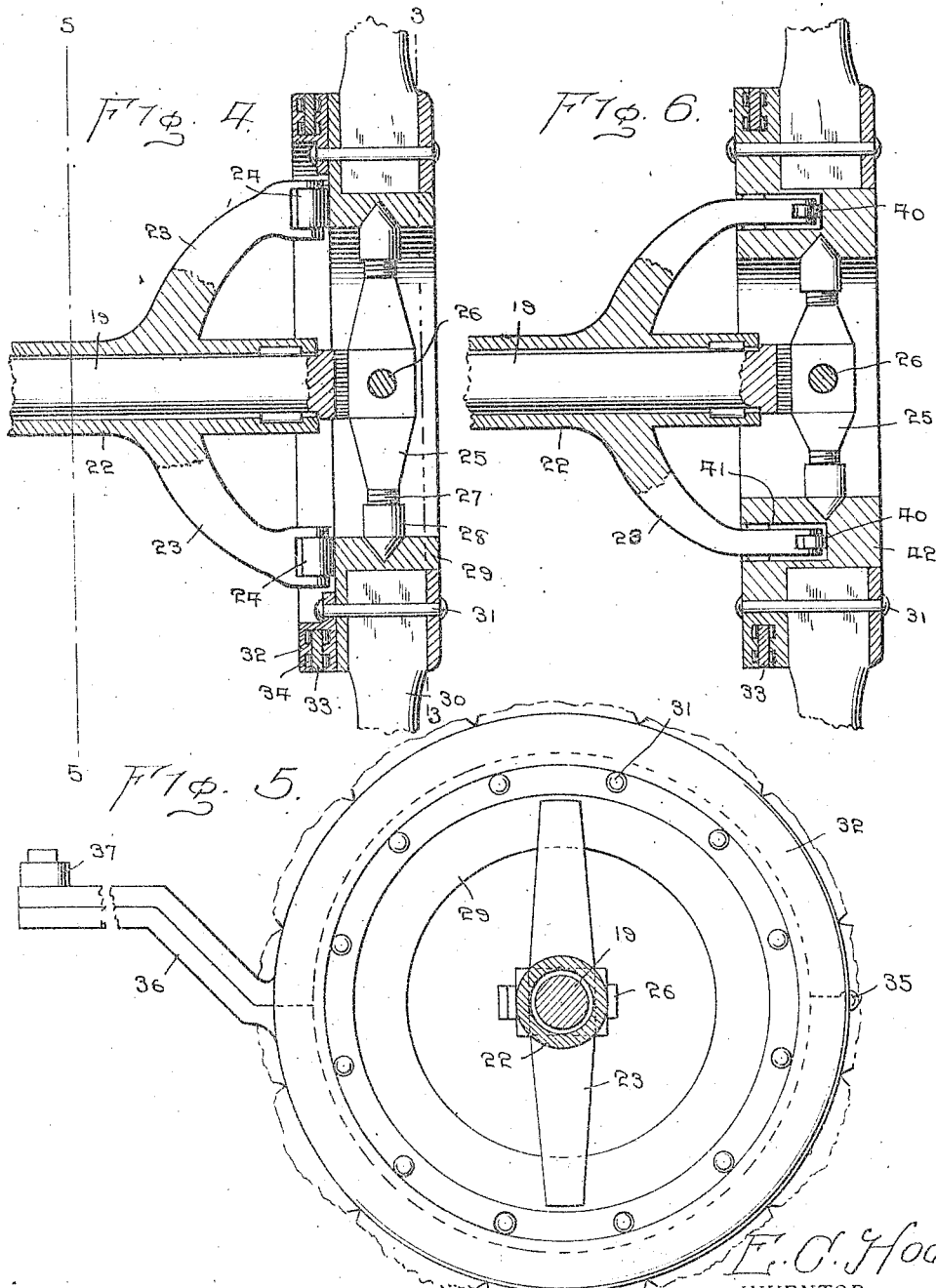

UNITED STATES PATENT OFFICE.

EUGENE C. HODGES, OF GREGORY, TEXAS.

FOUR-WHEEL DRIVE.

1,137,140.  Specification of Letters Patent.  Patented Apr. 27, 1915.

Application filed July 31, 1913. Serial No. 782,257.

*To all whom it may concern:*

Be it known that I, EUGENE C. HODGES, a citizen of the United States, residing at Gregory, in the county of San Patricio and State of Texas, have invented certain new and useful Improvements in Four-Wheel Drives; and I do hereby declare the following to be a full, clear, and exact description of the invention, such as will enable others skilled in the art to which it appertains to make and use the same.

This invention relates to a mechanism for driving the four wheels of a motor vehicle.

The object of the invention is to provide a driving mechanism for motor vehicles including a novel flexible driving connection for the steering wheels.

In the accompanying drawings, wherein is shown an approved form of my invention, Figure 1 represents a side elevation of a wheel mounted chassis of an automobile showing my improved driving mechanism as applied thereto. Fig. 2 represents a detail sectional view of the driving mechanism between the engine shaft and differential. Fig. 3 represents a sectional view on the line 3—3 of Fig. 4. Fig. 4 represents a vertical sectional view through the hub of one of the steering wheels. Fig. 5 represents a sectional view on the line 5—5 of Fig. 4, and, Fig. 6 represents a vertical sectional view through a slightly modified form of steering hub.

Referring to the drawings, wherein similar reference characters designate corresponding parts throughout the several views, 7 indicates the running gear or chassis of a motor vehicle supported over the wheels 8, and supporting the engine 9 having the rearwardly extending engine shaft 10. A clutch 11 and emergency brake 12 are preferably located on the engine shaft 10 and the latter is provided with a flexible and contractible connection 13 having the bevel pinion 14 at its rear end meshing with the pinion 15 fixed to the main shaft 16.

Bevel gears 17 and 18 are fixed at the front and rear ends respectively, of the main shaft 16, and the gear 17 meshes with a suitable gear fixed on the front axle 19 and rear gear meshes with a suitable differential 20 provided on the rear axle. The main shaft 16 together with the gears carried thereby are preferably mounted in a suitable housing or casing 21 for protecting these parts. The front axle 19 is also mounted in a casing 22 provided adjacent the opposite ends with outwardly directed forks or arms 23, carrying friction reducing rollers 24 at their free extremities rotatable on a vertical axis. The portions of the front axle 19 which project beyond the ends of the casing 22 are preferably enlarged slightly and bifurcated to receive the trunnions 25 pivoted therein by a transverse bolt 26. The medial portions of the trunnions 25 are of angular formation and the ends are tapered and rounded at 27 and screw threaded for the purpose of rigidly and adjustably securing the points 28, a suitable lock nut being employed, if desired.

The hubs 29 of the front wheels are provided with the usual spokes 30, the securing bolts 31 therefor also securing channeled rings 32 to the inner faces of the hubs. A circular band 33 is fitted in the channel of the ring 32 and suitable roller bearings 34 are interposed between said ring and band for reducing the friction.

The bands 33 are preferably formed in two parts for convenience in assembling, the parts being hinged at 35 and provided with rearwardly extending and contacting arms 36. The rear extremities of the arms 36 are connected by a suitable lever 37 to the steering wheel of the motor vehicle.

In operation, the rear wheels of the motor vehicle are driven in the usual manner through the rear axle, and the front wheels are also driven through the front axle 19. The rollers 24 of the arms 23, as will be understood, are rotatable on a fixed axis and materially assist in supporting the front wheels in a vertical plane and prevent collapsing thereof. The trunnions 25 connecting the hubs 29 with the axle 19 permit the steering wheels to be turned in the desired direction on a substantially vertical axis for steering the vehicle.

Referring to Fig. 6, wherein is disclosed a slightly modified form of the steering hub, 19 indicates the front axle and 22 the casing therefor provided with the arms or forks 24, the extremities of which are reduced and bifurcated to receive the rollers 40 having engagement within the inner wall of a channel 41 formed in the hub 42.

What I claim is:—

1. In a device of the character described, a driving axle, a hub, a trunnion pivotally mounted in the end of said axle, cone shaped caps adjustable upon said trunnion and pivotally supporting said hub upon the apexes thereof.

2. A device of the character described including a driving axle, a casing therefor, a hub, a trunnion pivotally mounted in the end of said driving axle, cone shaped caps adjustable upon the extremities of said trunnion and pivotally supporting said hub upon said apexes thereof, and means integrally connected to said casing for supporting said wheel in a vertical position.

3. A device of the character described including a driving axle, a casing therefor, a hub, a trunnion pivotally mounted in the end of said driving axle, cone shaped caps adjustable upon the extremities of said trunnion and pivotally supporting said hub upon the apexes thereof, a bearing surface secured to said hub supporting means for said hub operable upon said bearing surface and anti-frictional means interposed between said supporting means and said bearing surface.

4. A device of the character described including a driving axle, a hub, a channel ring secured to the inner face of said hub, an annular band seated in said channel ring and connected to a suitable steering mechanism, a trunnion pivotally mounted at the extremities of said driving axle and cone shaped caps adjustable upon the extremities of said trunnion and pivotally supporting said hub upon the apexes thereof.

5. A device of the character described including a driving axle, a casing therefor, a hub, a trunnion mounted upon the extremities of said driving axle and within said hub, cone shaped caps adjustable upon the extremities of said trunnion and pivotally supporting said hub upon the apexes thereof, means integrally connected to said axle casing for supporting said hub in a vertical plane and means interposed between said hub and a suitable steering mechanism for swinging the former upon the apexes of said trunnion cone caps as a pivot.

6. A device of the character described including a driving axle, a casing therefor, a hub, a trunnion mounted upon the extremities of said driving axle and within said hub, cone shaped caps adjustable upon the extremities of said trunnion, means integrally connected with said axle casing for supporting said hub in a vertical plane, said means being recessed into said hub and provided with anti-friction bearings and annular means carried by said hub and connected to a suitable steering mechanism for utilizing the pivotal movement of said hub upon the apexes of said trunnion cone caps.

In testimony whereof I have signed my name to this specification in the presence of two subscribing witnesses.

EUGENE C. HODGES.

Witnesses:
 LOUIE HALLIDAY,
 LEE MULLEN.